(12) United States Patent
Boehler et al.

(10) Patent No.: US 10,445,527 B2
(45) Date of Patent: Oct. 15, 2019

(54) DIFFERENTIAL PRIVACY AND OUTLIER DETECTION WITHIN A NON-INTERACTIVE MODEL

(71) Applicant: SAP SE, Walldorf (DE)

(72) Inventors: Jonas Boehler, Karlsruhe (DE); Daniel Bernau, Karlsruhe (DE); Florian Kerschbaum, Frankfurt (DE)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 15/387,052

(22) Filed: Dec. 21, 2016

(65) Prior Publication Data
US 2018/0173894 A1   Jun. 21, 2018

(51) Int. Cl.
| G06F 21/62 | (2013.01) |
| G06F 16/28 | (2019.01) |
| H04W 4/38 | (2018.01) |
| H04W 12/02 | (2009.01) |
| H04L 29/06 | (2006.01) |

(52) U.S. Cl.
CPC ........ *G06F 21/6254* (2013.01); *G06F 16/285* (2019.01); *H04L 63/0421* (2013.01); *H04W 4/38* (2018.02); *H04W 12/02* (2013.01)

(58) Field of Classification Search
CPC .... G06F 21/6254; G06F 16/285; H04W 4/38; H04W 12/02; H04L 63/0421
See application file for complete search history.

(56) References Cited

U.S. PATENT DOCUMENTS

| 6,332,366 | B1* | 12/2001 | Wray | G01F 1/8418 |
| | | | | 73/861.356 |
| 2004/0167669 | A1* | 8/2004 | Karlsson | G01C 21/12 |
| | | | | 700/259 |
| 2009/0301193 | A1* | 12/2009 | Schwartz | G01C 19/5684 |
| | | | | 73/504.12 |

(Continued)

OTHER PUBLICATIONS

Rina Okada, et al., Differential Private Analysis of Outliers, Graduate School of SIE, University of Tsukuba, Jul. 27, 2015. (Year: 2015).*

(Continued)

*Primary Examiner* — Nelson Giddins
(74) *Attorney, Agent, or Firm* — Mintz Levin Cohn Ferris Glovsky and Popeo, P.C.

(57) ABSTRACT

A system for differential privacy is provided. In some implementations, the system performs operations comprising receiving a plurality of indices for a plurality of perturbed data points, which are anonymized versions of a plurality of unperturbed data points, wherein the plurality of indices indicate that the plurality of unperturbed data points are identified as presumed outliers. The plurality of perturbed data points can lie around a first center point and the plurality of unperturbed data points can lie around a second center point. The operations can further comprise classifying a portion of the presumed outliers as true positives and another portion of the presumed outliers as false positives, based upon differences in distances to the respective first and second center points for the perturbed and corresponding (e.g., same index) unperturbed data points. Related systems, methods, and articles of manufacture are also described.

18 Claims, 9 Drawing Sheets

(56) References Cited

U.S. PATENT DOCUMENTS

| | | | |
|---|---|---|---|
| 2010/0162402 A1* | 6/2010 | Rachlin | G06F 21/6254 726/26 |
| 2010/0290734 A1* | 11/2010 | Kaplan | G01M 5/0091 385/12 |
| 2011/0179011 A1* | 7/2011 | Cardno | G06F 21/6227 707/709 |
| 2011/0301777 A1* | 12/2011 | Cox | G06F 1/206 700/299 |
| 2014/0281572 A1* | 9/2014 | Wang | G06F 21/6254 713/189 |
| 2015/0205856 A1* | 7/2015 | Brill | G06O 30/0201 707/737 |
| 2015/0286841 A1* | 10/2015 | Takenouchi | G06F 16/2228 726/26 |
| 2017/0039335 A1* | 2/2017 | Ismail | G16H 50/70 |
| 2017/0308802 A1* | 10/2017 | Ramsoy | G06N 7/005 |
| 2018/0058857 A1* | 3/2018 | Yost | G01C 21/165 |

OTHER PUBLICATIONS

Kun Niu, et al., ODDC: Outlier Detection Using Distance Distribution Clustering, PAKDD Proceedings of the 2007 international conference on Emerging technologies in knowledge discovery and data mining, pp. 332-343, May 22-25, 2007. (Year: 2007).*

"Cyber Systems and Technology." MIT Lincoln Laboratory: DARPA Intrusion Detection Evaluation. N.p., n.d. Web. <https://www.ll.mit.edu/ideval/data/index.html>.

A. Blum, C. Dwork, F. McSherry, and K. Nissim. Practical Privacy: The SuLQ Framework. In Proceedings of the twenty-fourth ACM symposium on Principles of database systems (PODS). ACM. 2005. pp. 128-138.

A. Blum, K. Ligett, and A. Roth, "A Learning Theory Approach to Noninteractive Database Privacy." STOC '08 Proceedings of the fortieth annual ACM symposium on Theory of computing. ACM 2008. pp. 609-617.

A. Boldyreva, N. Chenette, Y. Lee, and A. O'Neill, "Order-Preserving Symmetric Encryption," In Proceedings of the twenty-eighth International Conference on Advances in Cryptology (EUROCRYPT), 2009. Georgia Institute of Technology. pp. 1-24.

A. Machanavajjhala, D. Kifer, J. Abowd, J. Gehrke, and L. Vilhuber, "Privacy: Theory meets practice on the map," In Proceedings of the twenty-fourth International Conference on Data Engineering (ICDE), 2008.

A. Roth, "New Algorithms for Preserving Differential Privacy," PhD thesis, Carnegie Mellon University, 2010.

C. C. Aggarwal, "Outlier analysis. In Data Mining," pp. 237-263. Springer, 2015.

C. Dwork and A. Roth, "The algorithmic foundations of differential privacy," Foundations and Trends in Theoretical Computer Science, 9(3-4):211-407, 2014.

C. Dwork and G. N. Rothblum, "Concentrated Differential Priacy," ArXiv e-prints, Mar. 2016. pp. 1-28.

C. Dwork, "A Firm Foundation for Private Data Analysis," Communications of the ACM. ACM. 54(1):86-95, 2011.

C. Dwork, F. McSherry, K. Nissim, and A. Smith, "Calibrating Noise to Sensitivity in Private Data Analysis," In Proceedings of the third Conference on Theory of Cryptography (TCC), pp. 265-284. Springer, 2006. pp. 1-20.

C. Dwork, K. Kenthapadi, F. McSherry, I. Mironov, and M. Naor, "Our Data, Ourselves: Privacy via Distributed Noise Generation," In Proceedings of the twenty-fourth annual International Conference on the Theory and Applications of Cryptographic Techniques (EUROCRPYT), 2006. pp. 1-18.

D. Feldman, A. Fiat, H. Kaplan, and K. Nissim, "Private coresets," In Proceedings of the forty-first annual ACM symposium on Theory of computing (STOC), 2009.

D. Su, J. Cao, N. Li, E. Bertino, and H. Jin, "Differentially private k-means clustering," In Proceedings of the sixth ACM Conference on Data and Applications Security and Privacy (CODASPY), 2016.

E. Abend, "Data Sets." RIPE Labs. N.p., n.d. Web. <https://labs.ripe.net/datarepository/data-sets>.

E. Lui and R. Pass, "Outlier privacy," In Proceedings of the twelfth Conference on Theory of Cryptography (TCC), 2015.

F. McSherry, "Privacy integrated queries: an extensible platform for privacy-preserving data analysis," In Proceedings of the 2009 ACM International Conference on Management of data (SIGMOD), 2009.

F. Tramèr, Z. Huang, J.-P. Hubaux, and E. Ayday, "Differential privacy with bounded priors: Reconciling utility and privacy in genome-wide association studies," In Proceedings of the twenty-second ACM Conference on Computer and Communications Security (CCS), 2015.

I. Roy, S. T. Setty, A. Kilzer, V. Shmatikov, and E. Witchel, "Airavat: Secu-rity and privacy for mapreduce," In Proceedings of the seventh USENIX Con-ference on Networked systems design and implementation (NSDI), 2010.

I. Ruts and P. J. Rousseeuw, "Computing depth contours of bivariate point clouds," Computational Statistics and Data Analysis, 23(1):153-168, 1996.

K. Nissim, S. Raskhodnikova, and A. Smith, "Smooth sensitivity and sampling in private data analysis," In Proceedings of the thirty-ninth annual ACM symposium on Theory of computing (STOC), 2007.

K. Nissim, U. Stemmer, and S. Vadhan, "Locating a small cluster privately," In Proceedings of the thirty-fifth symposium on Principles of database systems (PODS), 2016.

M. E. Andrés, N. E. Bordenabe, K. Chatzikokolakis, and C. Palamidessi. Geo-Indistinguishability: Differential Privacy for Location-Based Systems. In Proceedings of the twentieth Conference on Computer and Communications Security (CCS). ACM. 2013. pp. 901-914.

M. Ester, H. P. Kriegel, J. Sander, and X. Xu, "A density-based algorithm for discovering clusters in large spatial databases with noise," In Proceedings of the second International Conference on Knowledge Discovery and Data Mining (KDD), 1996.

M. Hay, "Enabling accurate analysis of private network data," PhD thesis, University of Massachusetts, 2010.

M. Jawurek, "Privacy in Smart Grids," PhD thesis, University of Erlangen-Nuremberg, 2013. 256 pages.

M. Kearns, A. Roth, Z. S. Wu, and G. Yaroslavtsev, "Privacy for the protected (only)," ArXiv e-prints, May 2015.

M. V. Mahoney and P. K. Chan, "An analysis of the 1999 darpa/ lincoln laboratory evaluation data for network anomaly detection," In In Proceedings of the sixth International Symposium on Recent Advances in Intrusion Detection (RAID), 2003.

O. Goldreich. Foundations of Cryptography: Volume 2, Basic Applications. Cambridge University Press, 2009.

P. Mohan, A. Thakurta, E. Shi, D. Song, and D. E. Culler, "Gupt: Privacy preserving data analysis made easy," In Proceedings of the 2012 ACM International Conference on Management of Data (SIGMOD), 2012.

R. Agrawal, J. Kiernan, R. Srikant, and Y. Xu. Order Preserving Encryption for Numeric Data in Proceedings of the 2004 ACM International Conference on Management of Data (SIGMOD). ACM. 2004. pp. 536:574.

U. Erlingsson, V. Pihur, and A. Korolova, "Rappor: Randomized Aggregatable Privacy-Preserving Ordinal Response," In Proceedings of the twenty-first Conference on Computer and Communications Security (CCS). ACM. 2014. pp. 1054-1067.

V. Rastogi, M. Hay, G. Miklau, and D. Suciu, "Relationship privacy: output perturbation for queries with joins," In Proceedings of the twenty-eighth ACM symposium on Principles of database systems (PODS), 2009.

Okada, Rina, et al., "Differentially private analysis of outliers." *Joint European Conference on Machine Learning and Knowledge Discovery in Databases.* Springer, Cham, 2015.

Niu, Kun, et al. "ODDC: outlier detection using distance distribution clustering." *Pacific-Asia Conference on Knowledge Discovery and Data Mining.* Springer, Berlin, Heidelberg, 2007.

* cited by examiner

310

320

700

710 — Generate a perturbed data set by anonymizing an unperturbed data set based on a noise function

720 — Receive the perturbed data set comprising a plurality of perturbed data points containing anonymized versions of a plurality of unperturbed data points from the unperturbed data set

730 — Classify a portion of the plurality of unperturbed data points as presumed outliers based upon locations of the perturbed data points

740 — Classify a portion of the plurality of unperturbed data points as presumed non-outliers based upon locations of the perturbed data points

750 — Classify the presumed outliers as true positives and false positives based upon distance differences

760 — Classify a portion of the presumed non-outliers as false negatives based upon distance differences

770 — Provide a list of confirmed outliers

1: procedure OUTLIER DETECTION AND CORRECTION
2:    Sensors: Perturb data $S$ to $S' \leftarrow \mathcal{M}_L(S, f, RS_f/\epsilon)$ and send perturbed data $S'$ to the Analyst. ▶ *Perturb each dimension of the data $S$ with the Laplace mechanism $\mathcal{M}_L$ with relaxed sensitivity $RS_f$ calculated for the function $f$ and with privacy parameter $\epsilon$.*

Calculate the data center $c$ by averaging every dimension, calculate the distance differences $d_{\text{diff}} \leftarrow d_c(S') - d_c(S)$ and send $d_{\text{diff}}$ to the Correction Server. ▶ *$d_{\text{diff}}$ is the difference between the distance to the data center $c$ after perturbation, i.e. $d_c(S')$, and before perturbation, i.e. $d_c(S)$ for every point in the data.*

3:    Analyst: Perform standard outlier detection (e.g. DBSCAN) on the received data $S'$ and send the list $O$ of indices of the presumed outliers to the Correction Server.

4:    Correction Server: Calculate the threshold index $t \leftarrow \arg\max_{j \in J} d_{\text{diff}}[j+1] - d_{\text{diff}}[j]$ where $J$ is the list of indices sorted by ascending $d_{\text{diff}}$ value. ▶ *$t$ is the index with the biggest change between two adjacent distance differences.*

Separate indices into false positives list $\mathcal{FP} \leftarrow \{i \in O \mid d_{\text{diff}}[i] > d_{\text{diff}}[t]\}$ and true positives list $\mathcal{TP} \leftarrow O \setminus \mathcal{FP}$. ▶ *$\mathcal{FP}$ contains points incorrectly presumed to be outliers and $\mathcal{TP}$ contains points correctly presumed to be outliers.*

Calculate $d_{\mathcal{TP}} \leftarrow \min_{i \in \mathcal{TP}} d_{\text{diff}}[i]$. ▶ *$d_{\mathcal{TP}}$ is the minimum distance difference for all points indices from the list $\mathcal{TP}$.*

If the width of the outlier layer $w_O$ is unknown calculate $d_{\mathcal{FP}} \leftarrow \min_{i \in \mathcal{FP}} d_{\text{diff}}[i]$ as an approximation for $d_{\mathcal{TP}} + w_O$. ▶ *We assume $w_O$ to be known in the following.*

Send $d_{\mathcal{TP}}$ and $d_{\mathcal{TP}} + w_O$ to the Analyst.

5:    Analyst: Send $I_2 = \{i \in I \mid d_c(S'[i]) \geq d_{\mathcal{TP}}\}$, $I_3 = \{i \in I \mid d_c(S'[i]) \geq d_{\mathcal{TP}} + w_O\}$ to the Correction Server. ▶ *Produces two lists of indices with distance to the core in the perturbed data set greater than the thresholds received from the Correction Server.*

6:    Correction Server: Store false negatives layers in lists. First layer is $\mathcal{FN}_1 \leftarrow \{i \in I \mid d_{\text{diff}}[i] < 0\}$ where $I$ is the list of all indices. ▶ *The list $\mathcal{FN}_1$ contains indices whose distance difference is negative, they are the first layer of false negatives (i.e. presumed non-outliers that are actually outliers).*

Second layer is $\mathcal{FN}_2 \leftarrow \{i \in I_2 \mid 0 \leq d_{\text{diff}}[i] \leq d_{\mathcal{TP}}\}$. ▶ *Point indices whose distance difference is between 0 and $d_{\mathcal{TP}}$ and whose distance to the core is larger than $d_{\mathcal{TP}}$ (i.e. points from $I_2$)*

Third layer is $\mathcal{FN}_3 \leftarrow \{i \in I_3 \mid d_{\mathcal{TP}} \leq d_{\text{diff}}[i] \leq d_{\mathcal{TP}} + w_O\}$. ▶ *Indices whose distance difference is between $d_{\mathcal{TP}}$ and $d_{\mathcal{TP}} + w_O$ and whose distance to the core is larger than $d_{\mathcal{TP}} + w_O$ (i.e. points from $I_3$)*

Output the corrected outlier indices, which are: $\mathcal{TP}, \mathcal{FN}_1, \mathcal{FN}_2, \mathcal{FN}_3$.

7: end procedure

FIG. 8

DIFFERENTIAL PRIVACY AND OUTLIER DETECTION WITHIN A NON-INTERACTIVE MODEL

STATEMENT OF GOVERNMENT SPONSORED SUPPORT

Certain aspects of the subject matter described herein were developed with funding from European Union's Horizon 2020 research and innovation programme under grant agreement Nos. 700294 and 653497.

TECHNICAL FIELD

The subject matter described herein relates to data security, and more particularly, differential privacy and/or outlier detection within a non-interactive model.

BACKGROUND

Cloud computing refers to a practice in which a data owner uses remote storage and/or computing resources (e.g., data as a service (DaaS), storage as a service (STaaS)) to store, manage, and/or process data in addition to or instead of local storage and/or computing resources. Outsourcing the storage, management, and/or processing of data in this manner may provide a convenient and cost effective solution for limited local storage and/or computing resources. However, by storing data within a remote database, a data owner can relinquish control over the data to a potentially untrusted cloud service provider or hackers, risking exposure of sensitive data to possible misuse. For instance, outsourced data can be stored in a multi-tenant remote database and may thus comingle with data belonging to other data owners.

To prevent unauthorized access to or misuse of data stored at the remote database, a data owner may choose to use encryption techniques or other security measures. However, in some aspects, it may be desirable to share anonymous data with others, which generally would not be possible if the data were encrypted. The ability to anonymously share such data is a driving force behind the value of "Big Data." Big Data can be used by companies to optimize targeted marketing efforts and increase sales/revenues. Accordingly, it can be desirable to store and/or provide anonymized data.

SUMMARY

In some aspects, a method, computer program product and system are provided. In an implementation, a privacy system is provided. The privacy system can include (or otherwise utilize) at least one processor and/or memory, which can be configured to perform operations including receiving a plurality of indices for a plurality of perturbed data points from an perturbed data set, wherein the plurality of perturbed data points are anonymized versions of a plurality of unperturbed data points with the same plurality of indices, wherein receiving the plurality of indices indicates that the plurality of unperturbed data points are identified as presumed outliers, wherein the plurality of perturbed data points lie around a first center point, and wherein the plurality of unperturbed data points lie around a second center point. The operations can further include classifying, based upon distance differences, a first portion of the presumed outliers as true positives, wherein the distance differences include, for each of the plurality of perturbed data points, a difference between a distance of the perturbed data point from the first center point and a distance of a corresponding unperturbed data point from the second center point.

In some implementations, the plurality of unperturbed data points are held among a plurality of sensor devices. In some variations, the operations can further comprise determining a threshold distance from the first center point and/or classifying, based upon the distance differences, a second portion of the presumed outliers as false positives. Each presumed outlier can be classified as a false positive when a corresponding distance difference for the presumed outlier is less than (or equal to) the threshold distance away from the first center point and/or each presumed outlier can be classified as a true positive when a corresponding distance difference for the presumed outlier is greater than the threshold distance away from the first center point. In some variations, the operations can further include ordering each of the distance differences in an ordered list, identifying a largest change between two consecutive differences in the ordered list, and/or setting the threshold distance as the largest change. The plurality of perturbed data points can be anonymized based upon a noise function, wherein the noise function includes a perturbation function.

In some variations, the operations can further comprise determining whether any of the distance differences are negative, and/or classifying each of the plurality of unperturbed data points with a negative distance difference as a false negative. In some variations, the operations can further comprise identifying a minimum distance difference from among the true positives, receiving indices for a plurality of non-outliers with a distance from the first center point that is greater or equal to the minimum distance, and/or reclassifying, as false negatives, each of the plurality of non-outliers with a distance difference between zero and the minimum distance difference. In some variations, the operations can further comprise setting an outer boundary value to equal a sum of the minimum distance difference and a width of an outlier layer, wherein the width of the outlier layer is a difference between an end and a beginning of an area in a coordinate space that includes the outliers. In related implementations, the operations can further comprise receiving indices for a plurality of non-outliers with a distance from the first center point that is greater or equal to the outer boundary value and/or reclassifying, as false negatives, each of the plurality of non-outliers with a distance difference between the threshold distance and the outer boundary.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 depicts an example of a method for differential privacy and/or outlier detection, in accordance with some example implementations;

FIG. 8 depicts an example of a procedure for outlier detection and/or correction, in accordance with some example implementations.

When practical, similar reference numbers denote similar structures, features, or elements.

DETAILED DESCRIPTION

As noted above, it can be desirable to store and/or provide anonymized data. One technique for data anonymization is known as differential privacy. Differential privacy can provide formal guarantees about the privacy level and/or protection against re-identification of any participant within a given data set. An "interactive" model and/or a "non-interactive" model can be used to provide these guarantees, depending upon the implementation. The interactive model can be a system which allows only a limited number of queries on a full data set, D. When the limit on queries is exceeded, the data set may be destroyed in order to preserve anonymity. The non-interactive model can be a system which allows for an unlimited number of queries on a sanitized version of the full data set, D'. If infinite queries are allowed upon the data, then monitoring of the number of queries already run on the data (e.g., on a per-device and/or per-user basis) is no longer necessary. Further, if a device with limited storage is able to outsource D' to the cloud, storage within the device can be feed up. However, current implementations of using the non-interactive model often try to protect the security of outliers, when it may be more beneficial to decrease the security provided to outliers and increase the security provided to non-outliers (which can be a large majority, such as 90%).

In some implementations of the current subject matter, a data owner, a data client, and/or a cloud service provider can be configured to execute/provide a differential privacy protocol to provide anonymized data through a non-interactive model. As previously noted, the data owner may outsource data (e.g., for storage, management, and/or processing) to the cloud service provider. The data owner can sanitize its data prior to outsourcing it to the cloud service provider such that only a portion of the data is outsourced to the cloud service provider. According to some implementations of the current subject matter, the cloud service provider can detect whether users attempting to access the data should be trusted or not. If not, then access to the data (e.g., queries by untrusted users upon the data) can be prohibited. Similarly, outliers within data sets representing sensor data can be identified such that issues with sensors and/or whatever the sensor is monitoring can be detected.

Figure 1:
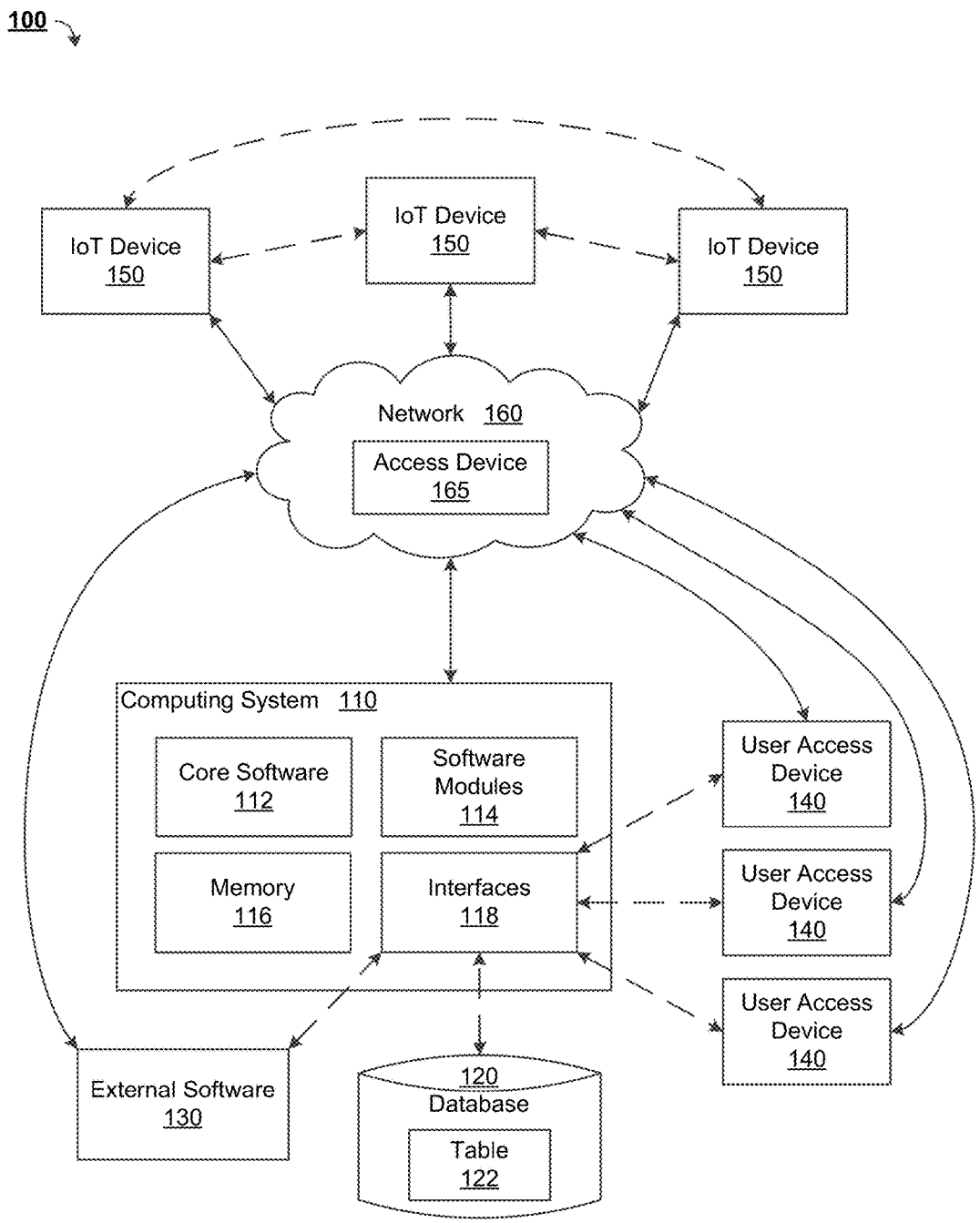
FIG. 1 depicts a block diagram of a system for differential privacy and/or outlier detection within a non-interactive model, in accordance with some example implementations.

FIG. 1 illustrates a functional block diagram of a system 100 in which features consistent with the described subject matter may be implemented. As illustrated, the system 100 can include a computing system 110 capable of communicating with one or more user access devices 140 and/or one or more Internet of things (IoT) devices 150. In some aspects, the computing system can utilize one or more interfaces 118 for communication. Communication among the devices in the system 100 can be through the use of direct communications, such as through the use of a wireless connection like Bluetooth, near-field communication (NFC), ZigBee, WiFi, some combination thereof, and/or the like. Additionally or alternatively, communication among the devices in the system 100 can be through the use of a hard wire connection such as universal serial bus (USB) and/or the like. Communication can additionally or alternatively occur through indirect communications, such as over a network 160, which can include a local area network, a wide area network, a wireless network, the Internet, some combination thereof, and/or the like.

Communication over the network 160 can utilize a network access device 165, such as a base station, a Node B, an evolved Node B (eNB), an access nodes (ANs), a hotspot, and/or the like. In some aspects, any of the user access device 140 and/or the IoT devices 150 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like. Wired or wireless communication among the computing system 110, user access devices 140, and/or IoT devices 150 can occur according to various protocols and/or access technologies (e.g., Global System for Mobile Communication (GSM), Universal Mobile Telecommunications System (UMTS), technologies developed by IEEE such as WiFi and/or Bluetooth, technologies developed by the Third Generation Partnership Project (3GPP) or 3GPP2 such as Long Term Evolution (LTE) and/or CDMA2000, etc.).

In some aspects, one or more of the IoT devices 150 can be configured to operate and/or communicate according to low-power techniques. For example, the IoT devices 150 can be configured to utilize less battery power, less processing power, and/or sleep states. In some implementations, at least a portion of the IoT devices 150 can be autonomous or semi-autonomous. For example, the IoT devices 150 can store configuration information for themselves and/or for other IoT devices 150. Thus, a user may be able to access one IoT device 150 and change the configuration of other IoT devices 150, such as any other IoT device 150 that is, for example, in a chain with the accessed IoT device 150. Software modifications/updates may be provided to multiple IoT devices 150 in a similar manner. In some implementations, a "chain" can be established among IoT devices 150 via blockchain techniques to exchange data and/or provide guarantees about the data. In some implementations, blockchain techniques can include the use of a distributed database that maintains a continuous/growing list of records (e.g. "blocks"), which can be secured from tampering/revision, and/or contain timestamps and/or links to a previous block. Information may be additionally or alternatively provided/maintained in other ways and/or according to other techniques.

In some aspects, an IoT device 150 can store configurations for the complete active and/or passive set of connected IoT devices 150, which may be encrypted. For example, in a "smart home" setup, a device for climate can measure humidity, temperature, etc., and a device for controlling the heating/air-conditioning can have an active connection to the device for climate and act upon certain measurements. A passive connection may additionally or alternatively exist, where a sensor detects motion and provides an indication to a light switch to turn on a light. In some implementations, each of these devices in the smart home setup can belong to a single system and/or contain configuration information for the complete chain. However, some of the configuration data can be active (e.g., used by the interaction) and/or some of the configuration data can be passive (e.g., to keep the collective chain alive).

As illustrated, the computing system 110 can include core software 112 and/or one or more software modules 114. The core software 112 can provide one or more features of a high-level programming software system. The software modules 114 can provide more specialized functionality. For example, the core software 112 and/or software modules 114 can include IoT management, database management, and/or data anonymization features. In some aspects, the core software 112 or other similar software/hardware can be capable of accessing a database layer, such as the database 120 including at least one table 122 having at least one column/row. The database table 122 can store any kind of data, potentially including but not limited to operational data retrieved from IoT device 150. In some implementations, the database table 122 can include definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

In some aspects, the core software 112 can be configured to load the information from the database 120 to memory 116 (e.g., main memory) in response to receipt of a query instantiated by a user or computer system through one or more IoT devices 150, user access devices 140, the external software 130, and/or the like. In some implementations, all, substantially all, or at least a large amount of the operational data of the database 120 can reside in-memory (e.g., in random-access memory (RAM)). Although the database 120 is illustrated as being separate and, at times, described as being separate from the computing system 110, in various implementations, at least a portion of the database 120 can be located within the computing system. The database 120 may be a column store database and/or the computing system 110 may be configured to perform OLTP (online transaction processing) and/or OLAP (online analytical processing), which can include complex analytics and tasks.

In some aspects, one or more of the software modules 114 can be configured to utilize data stored in the memory 116, data stored in the database 120, and/or data otherwise accessible to the computing system 110. As further illustrated, the computing system 110 can be capable of utilizing external software 130. In some aspects, the external software 130 can provide additional functionalities or services which may not be available at the computing system 110. In some aspects, the external software 130 may include cloud services. In some aspects, the computing system 110 can aggregate or otherwise provide a gateway via which users can access functionality provided the external software 130. In some implementations, the database 120 and/or the external software 130 can be located across one or more servers, and/or communication among the computing system 110, the database, and/or the external software 130 can occur over the network 160.

At least a portion of the illustrated system 100 may include hardware and/or software that interacts with a database, users, and/or other software applications for defining, creating, and/or updating data, for receiving, handling, optimizing, and/or executing database queries, and/or for running software/applications (e.g., software modules 114, and/or external software 130) which utilize a database. In some aspects, the database 120 can be a structured, organized collection of data, such as schemas, tables, queries, reports, views, and/or the like, which may be processed for information. The database 120 may be physically stored in a hardware server or across a plurality of hardware servers. In some aspects, the system 100 may be implemented as a cloud-based system and/or an IoT system.

With increased prevalence of IoT devices 150 in households, data generated and/or held by IoT devices 150 can be very personal in nature. For this reason, this data can be extremely valuable to companies (e.g., for billing or sales purposes). However, if a specific household can be identified based upon the data, then the household can become vulnerable. For example, if a malicious actor was able to identify a household and/or determine what times of the day members of a household were away, then the household could become vulnerable to malicious acts, such as burglaries. Other vulnerabilities are possible, such as financial vulnerabilities. In the event something happens to the household, then the company holding the data (e.g., a cloud service provider) can be subject to liability as well. Thus, it is important to preserve the anonymity of the data stored within the cloud. In some aspects, these malicious actors can be regarded as "outliers." Outliers can similarly refer to faulty systems and/or the like, depending upon the implementation.

Figure 2:
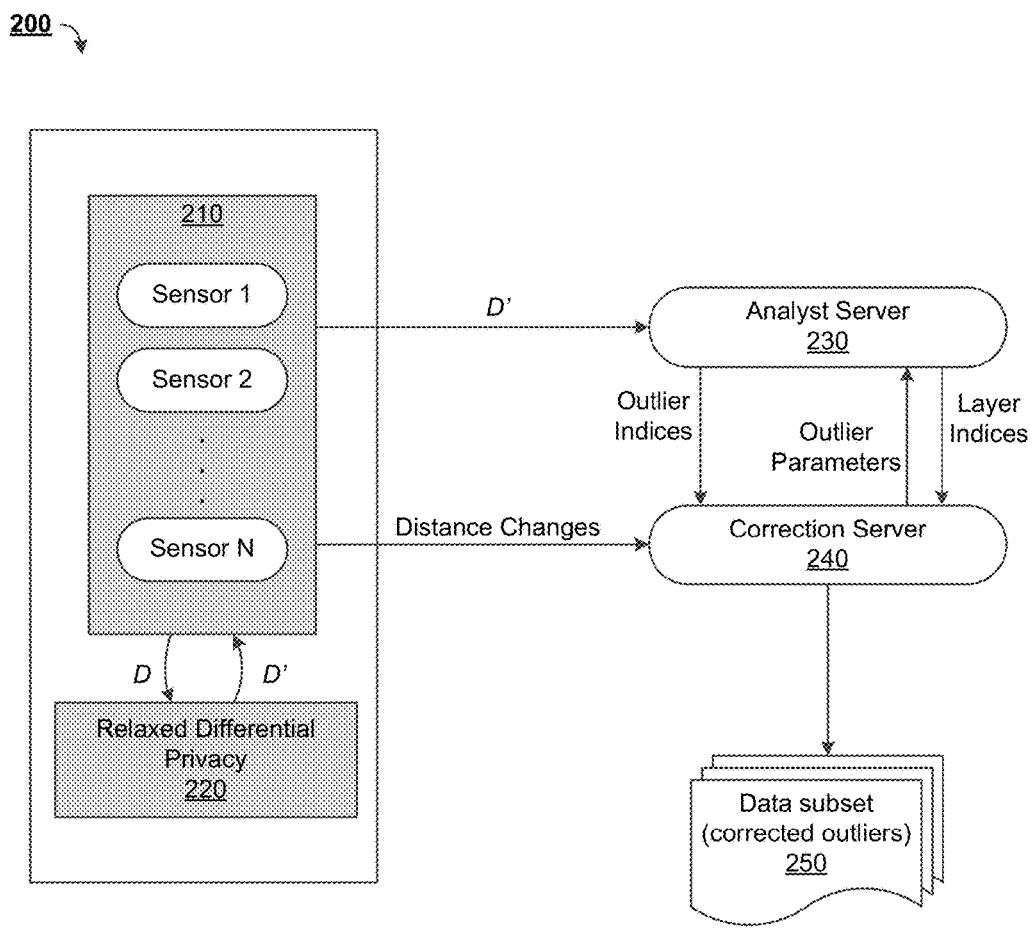
FIG. 2 depicts a block diagram of another system for differential privacy and/or outlier detection within a non-interactive model, in accordance with some example implementations.

FIG. 2 depicts a block diagram of another system 200 for differential privacy and/or outlier detection within a non-interactive model, in accordance with some example implementations. In some aspects, the system 200 can be similar to the system 100 of FIG. 1. As illustrated, the system 200 can include a plurality of sensors 210. These sensors 210 can be regarded as data owners, and can include IoT devices 150 or otherwise obtain data from IoT devices 150 to generate a data set D.

In some implementations, the plurality of sensors 210 can process their respective data sets D based upon a relaxed differential privacy procedure 220 to generate and/or release a sanitized data set D'. In turn, D' can be provided to an analyst server 230, which can use the data as a source for outlier detection. In some implementations, the algorithms executed by the analyst server 230 can be used to generate two groups of elements with different privacy guarantees: outliers and non-outliers. This sanitization and/or grouping can be regarded as a first phase of an outlier detection procedure.

In some aspects, the data set D can include points with a plurality of attributes. At least a portion of these attributes can be used to map the points within a coordinate space (e.g., two dimensional space or higher). The grouping of the points into outliers and non-outliers can be based upon density, which can mean where the majority of the points are concentrated. Application of the relaxed differential privacy procedure 220 can be regarded as perturbation, as some of the data points in the sanitized data set D' may be further away from or closer to a center of a cluster of points in the original data set D. Ideally, perturbation pushes all outliers away from the cluster so that they can easily be identified. However, perturbation can inherently lead to false positives (e.g., elements identified as outliers which should not be regarded as outliers) and/or false negatives (e.g., elements identified as non-outliers which should be regarded as outliers). Therefore, the groups and/or parameters defining the groups can be provided to a correction server 240 to process the groups/parameters and eliminate false positives and/or false negatives. For example, a list of indices for outliers and/or a list of indices for non-outliers can be provided from the analyst server 230 to the correction server 240. This re-grouping can be regarded as a second phase of the outlier detection procedure.

In order to perform this re-grouping, the correction server 240 can utilize additional information provided by the data owner(s) (e.g., the sensors 210). In some aspects, the additional information can be historic information, which can be particularly useful if an underlying distribution/pattern does not change drastically within a short period of time. The additional information can include distance change information, or information used to derive distance changes. Distance changes can refer to how far and/or in what direction points in the sanitized data set D' have moved from the original data set D. In some implementations, distance can be Euclidian distance.

In some aspects, the correction server 240 may not be provided with the actual locations of the points within the original data set D or the locations of the points within the perturbed data set D', as this could make the underlying data less secure. Similarly, the analyst server 230 may be provided with the location of perturbed points and their indices, but not their original location or their distance changes. However, in order to facilitate outlier detection, the correction server 240 can provide the analyst server 230 with outlier parameters for the detected true positives (e.g., outliers originally and correctly detected by the analyst server to be outliers) and/or false positives (e.g., outliers originally detected by the analyst server 230 to be non-outliers). For example, the correction server 240 can provide the analyst server with the minimum distance change of detected true positives and/or false positives, and/or the width of an outlier later as outlier parameters. In some aspects, the width of an outlier later can be provided to the correction server 240 by the plurality of sensors 210 or may otherwise be known/stored via the correction server 240.

In some implementations, the correction server 240 can have knowledge of the indices of the (presumed) outliers identified and/or provided by the analyst server 230. In some aspects, the correction server 240 can have knowledge of the distance changes for all point indices, or some portion thereof, identified and/or provided by the sensors 210. In some implementations, the analyst server 230 may determine and/or provide a set of reduced indices for the correction server 240 to analyze, based upon the outlier parameters provided by the correction server 240.

The result of the correction server 240 can be a data subset 250, which can include a list of corrected outliers. Thus, the system 200 can provide for the identification of individual outliers instead of just identifying areas in which outliers may be present. In some aspects, the outlier-detection procedures described herein can individually identify around 95% of the outliers (e.g., where there is a large enough separation between outliers and non-outliers, for two-dimensional data-points, and/or an assumed perfect separation between false positives and true positives). The data subset 250 can be further processed/filtered via secure computation to contain only outliers. In some implementations, the identification of outliers by the system 200 can occur periodically, which can allow for early detection of outliers and/or early preventative actions.

Figure 3A:
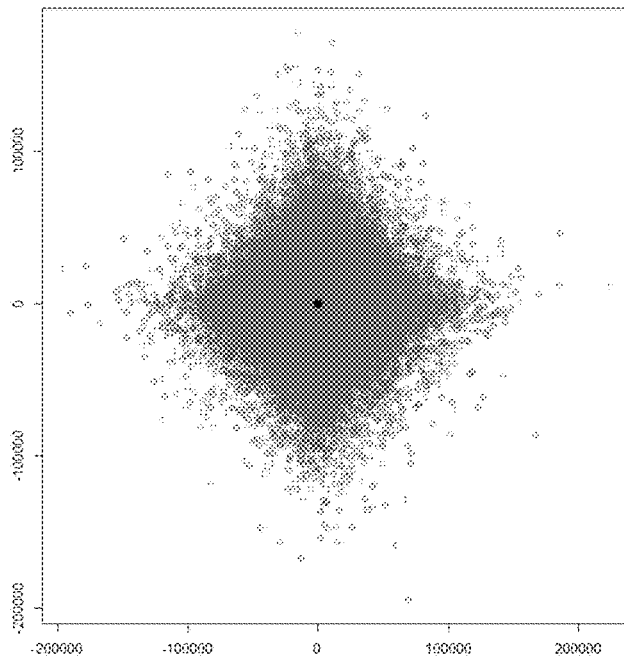
FIG. 3A depicts a graph of unperturbed and perturbed data points in a coordinate space, in accordance with some example implementations.

In some implementations, the relaxed differential privacy procedure 220 can perform "sanitation" of the original data set D to generate perturbed data points based upon a Laplace mechanism and/or can be tailored for data sets containing outliers. For example, FIG. 3A depicts a graph 310 of perturbed and unperturbed data points in a coordinate space, in accordance with some example implementations. As illustrated, the data points can be centered on a zero point. Although the graph 310 contains perturbed and unperturbed data points, the illustrated implementation may be designed to protect non-outliers as well as outliers, making the differences in topology invisible and/or concentrating the outliers near the center point.

The location of the perturbed data points can be based upon sensitivity of an evaluation function (e.g., an identity function). The sensitivity of a function $f$ can refer to the noise magnitude needed to sanitize a data set to preserve differential privacy. For example, based upon the sensitivity and/or a privacy parameter $\epsilon$, a required perturbation can be calculated. Lower sensitivity can produce a lower noise magnitude, and thereby, more accurate results.

For example, the global sensitivity $GS_f$ of a function $f:D^n \rightarrow R^k$ can determine the worst-case change that the omission or inclusion of a single individual's data can have on $f$. For example, if $f$ is a counting query (e.g., "How many males are in the data set?"), the removal of an individual can only change the result by 1. Thus, the global sensitivity is 1. Therefore, $GS_f$ has to cover all neighboring databases, whereas insecure local sensitivity $LS_f$ (D) covers one fixed database instance $D \in D^n$ and all its neighbors. In some aspects, insecure can refer to the fact that in certain cases with low local sensitivity, there may be neighbors with high local sensitivity, thereby allowing an attacker to potentially distinguish them by the sensitivity-dependent noise magnitude alone, for example. Smooth sensitivity $SS_f$ (D), however, can compare a fixed database instance D with all other database instances, but with respect to the distance between them and a privacy parameter $\beta^1$. Representations of these sensitivities are shown in Table 1.

TABLE 1

| Global | |
|---|---|
| $GS_f = $ | $\max\limits_{D_1, D_2:\, d_H(D_1, D_2) = 1} \; \|f(D_1) - f(D_2)\|_1$ $D_1, D_2 \in D^n$ |
| Local | |
| $LS_f(D_1) = $ | $\max\limits_{D_2:\, d_H(D_1, D_2) = 1} \; \|f(D_1) - f(D_2)\|_1$ $D_2 \in D^n$ |
| Smooth | |
| $SSf,\, \beta(D_1) = $ | $\max\limits_{D_2 \,\in\, D_n} (LSf(D_2) e^{-\beta d_H(D_1, D_2)})$ |

The changed parameters among the different sensitivities are the allowed distance between databases $D_1$, $D_2$ (1 for $GS_f$ and $LS_f$, unrestricted for $SS_f$) and the choice of databases $D_1$ (a single fixed database instance for $LS_f$ and $SS_f$, unrestricted for $GS_f$). In some aspects, D can refer to a database and/or collection of records from $D^n$ (e.g., $D \in D^n$), where each entry $D_i$ represents one participant's information. The distance between two databases can be based upon the number of entries in which they differ. In some aspect, databases x and y (where x, $y \in D^n$) can be referred to as neighbors if the distance between them is equal to one. In some implementations, distance can be calculated based upon a Hamming function, such as: $d_H(x, y) = |\{i:\, x_i \cdot y_i\}|$ Differential privacy can be a strong privacy guarantee due to its assumptions that a malicious actor has complete knowledge about the data set except for a single record and still covers all possible data sets with a defined privacy guarantee. However, relaxing the privacy guarantee to only a subset of all possible data sets (e.g., by reducing the sensitivity and thereby noise magnitude) can allow for greater utility, such as the ability to discover outliers. Thus, in some embodiments, the relaxed differential privacy procedure 220 can utilize an adaptive noise magnitude that ensures a strong differential privacy guarantee for the normal behaving majority and/or relaxes it for outliers.

If the privacy guarantee only matters for a group of individuals, referred to as non-outliers N, as opposed to every single individual in a set $D^n$, which also includes outliers O (e.g., $D^n = N \cup O$), then only enough noise to protect the elements in N is necessary. This can be achieved through the notion of relaxed sensitivity $RS_f$ of a function $f$, shown in Table 2.

TABLE 2

| Relaxed | |
|---|---|
| $RS_f^{N,D^n} = $ | $\max\limits_{D_2:\, d_H(D_1, D_2) = 1} \; \|f(D_1) - f(D_2)\|_1$ $D_1, D_2 \in N$ |

In other words, for all databases which include non-outliers N and differ by one record ($d_H(D_1, D_2)=1$), for a given function $f$, the maximum impact is calculated/identified. In some aspects, the minimum impact can be zero.

Figure 9:
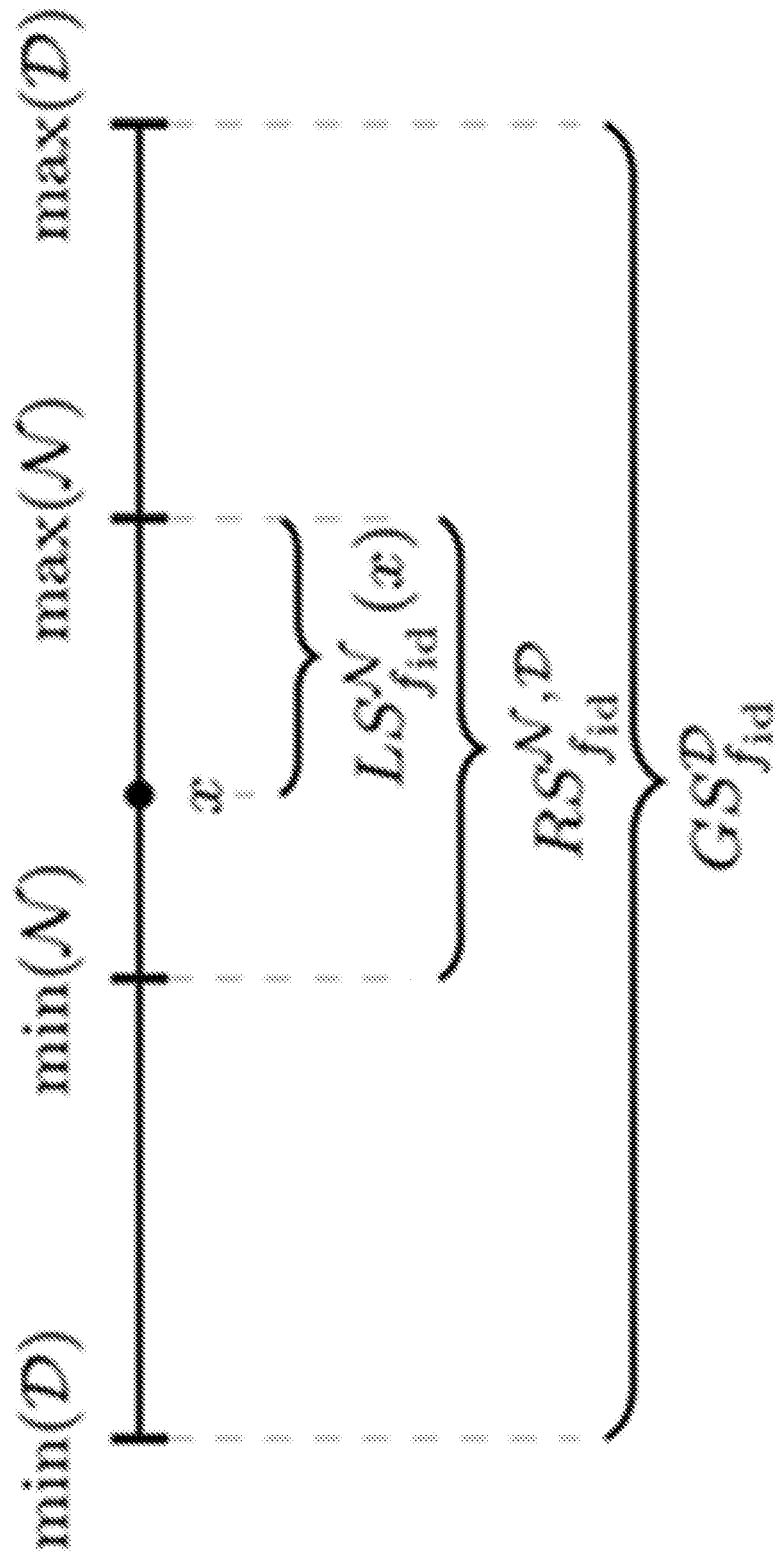
FIG. 9 depicts an example of a graph, in accordance with some example implementations.

In some aspects, local sensitivity $LS_f$ of a function $f$ may only hold for one fixed database instance x, whereas the relaxed sensitivity $RS_f$ can cover all databases from the subset N. Similarly, global sensitivity $GS_f$ covers the full data set D, which contains non-outliers N, as well as outliers O. These differences are illustrated in Graph A at FIG. 9.

The function $f_{id}$ can refer to an identity function. However, other functions are possible.

As noted above, the set of perturbed points in the graph 310 can be generated based upon a distribution mechanism, such as a Laplace mechanism. In some implementations, a Laplace mechanism for a function $f:D^n \to R^k$ can be represented as:

$$M_L(x, f(\cdot), GS_f/\epsilon) = f(x) + (Y_1, \ldots, Y_k)$$

where $Y_i$ are independent and/or identically distributed random variables drawn from a distribution function, such as Laplace ($GS_f/\epsilon$).

The distribution mechanism can compute $f$ and perturb each coordinate with random noise drawn from a distribution function. In some implementations, a distribution function utilized can be a Laplace distribution function represented as:

$$\text{Laplace}(x, b) = \frac{1}{2b} \exp\left(-\frac{|x|}{b}\right)$$

where b is a scale centered around zero.

In some aspects, the Laplace distribution function can be regarded as a probability density function.

For relaxed differential privacy, the scaling parameter used in the Laplace mechanism ($GS_f/\epsilon$) can be changed to $RS_f/\epsilon$, leading to sample noise from Laplace ($RS_f/\epsilon$). In a database consisting of n=k columns, the perturbation can be performed on individual columns. For example, the Laplace mechanism can receive a database column (e.g., a vector) as input, and output a perturbed vector. In the end, each column can receive independently drawn noise from the Laplace mechanism. Although a particular Laplace mechanism is described, other mechanisms are possible.

Based upon the location of the data points in the perturbed set, each data point can be preliminarily classified as an outlier O or a non-outlier N. In some implementations, at least some of the outlier topology from the unperturbed data set is preserved for this outlier detection, such as location, density, depth, neighborhood, and/or the like. Ideally, the greater the preservation of the outlier topology, the greater the accuracy of detection of outlier within the perturbed data set. For example, each data point that is less than a threshold distance away from a center point can be classified as a non-outlier, and/or each data point that is greater than the threshold distance away from the center point can be classified as an outlier. In some implementations, other outlier detection algorithms can be used, such as those relying upon DBSCAN functions, ISODEPTH functions, and/or the like. As noted above, this preliminary classification can be performed by the analyst server 230. However, the locations of the perturbed data points can include false positives and negatives, which should be identified and/or placed within a proper data set (e.g., outliers).

Figure 3B:
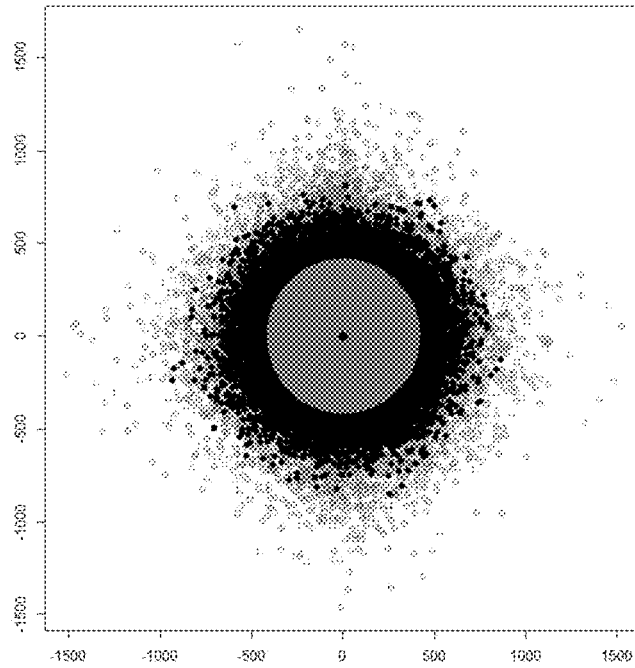
FIG. 3B depicts a graph of unperturbed data points overlaid on perturbed data points in a coordinate space, in accordance with some example implementations.

FIG. 3B depicts a graph 320 of unperturbed data points (the darker points) in a coordinate space overlaid on the perturbed data points (the lighter points), similar to the graph 310 of FIG. 3A, in accordance with some example implementations. As can be seen, the perturbed data points can be in similar locations to the unperturbed data points, can be closer to the center than any of the unperturbed data points, and/or can be further away from the center than any of the unperturbed data points. Thus, although the perturbation can provide security guarantees, it can also introduce errors in the preliminary classification. Thus, additional processing can be required to determine the identities of true outliers and non-outliers. In comparison to the graph 310 FIG. 3A, the graph 320 can illustrate the topology of outliers and non-outliers better, which can be due to the use of a function with relaxed sensitivity.

Figure 4:
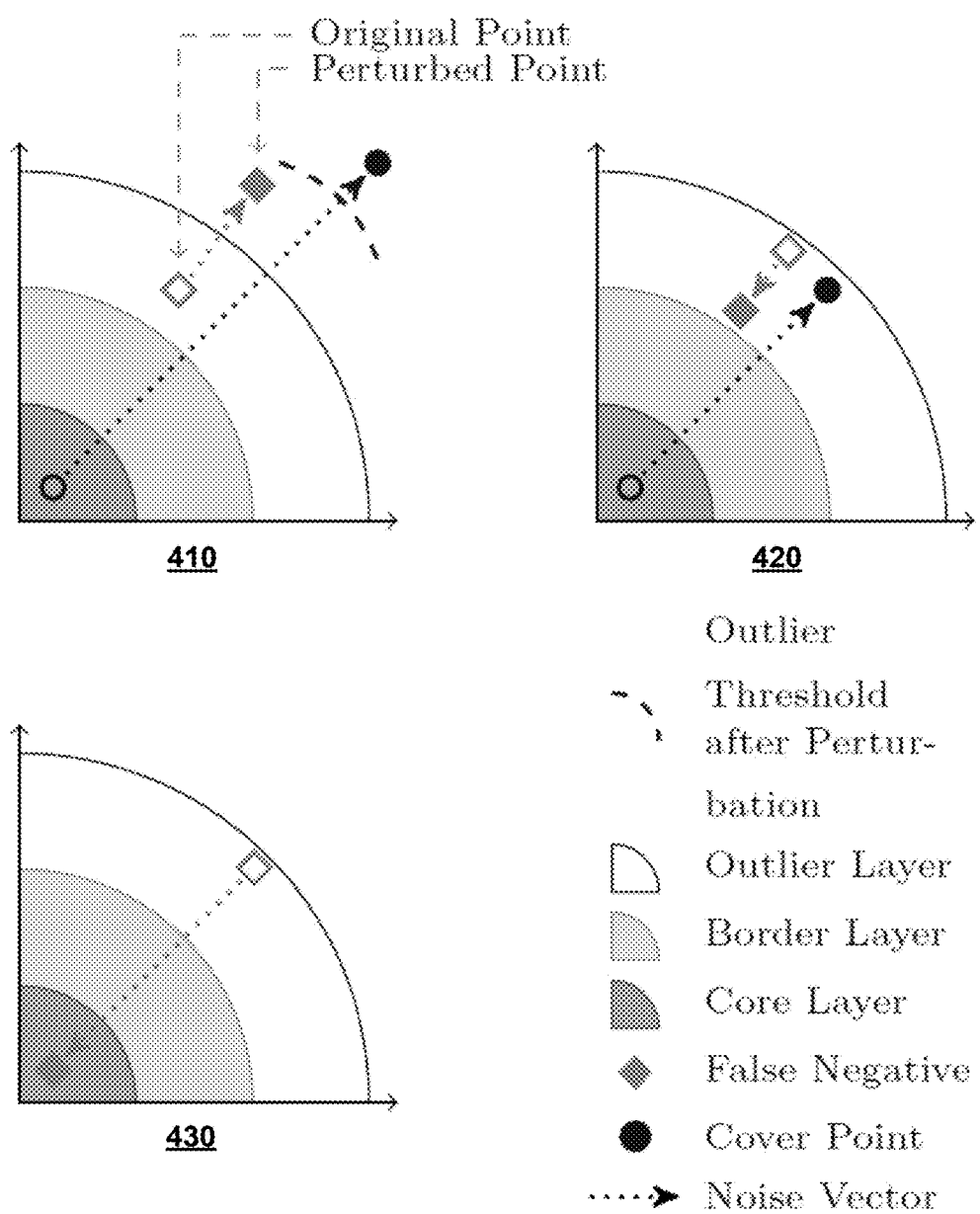
FIG. 4 depicts graphs of data points before and after perturbation, in accordance with some example implementations.

In some implementations, errors introduced by grouping estimations can be detected based on the change in distance from the center after perturbation. For example, FIG. 4 depicts graphs 410, 420, 430 of data points before and after perturbation, in accordance with some example implementations. Each of the graphs 410-430 illustrates a potential issue with the perturbed data that can lead to errors in classification. As noted above, these errors can be detected and/or corrected (e.g., through re-classification) by the correction server 240, for example.

As illustrated a coordinate space for data points can be defined to include a core layer, a border layer, an outlier layer, and/or an outlier threshold after perturbation. Points which lie within the core layer should be classified as non-outliers and/or points which lie within the outlier layer should be classified as outliers. However, the locations of the original points are not available outside of the data owner, so techniques for classifying and/or re-classifying the points must be used to estimate. The border layer can define an empty area between the core layer and the outlier layer. In some implementations, these layers can be defined based upon historical data, data from the unperturbed data points, and/or data from the perturbed data points. For example, in some aspects, the outlier layer can be defined to include an area in which anomalies are known to occur (e.g., readings from a sensor which a manufacturer/controller/monitor knows are representative of issues with the sensor). In some aspects, the illustrated layers can be layers for unperturbed points and/or different layers can exist for perturbed points (e.g., the outlier threshold after perturbation can be further away from the center, as illustrated in the first graph 410).

As further illustrated, diamonds can represent points which are false negatives, where the hollowed diamond represents the location of the original point (e.g., unperturbed) and filled diamond represents the location of the perturbed point. Circular points can represent known non-outliers which are perturbed a certain distance from the center. As illustrated, the hollowed circle represents the location of the original point (e.g., unperturbed) and the filled circle represents the location of the perturbed point. Each arrow can represent a noise vector, where the perturbation causes the point to move by a certain magnitude in the illustrated direction of the arrow.

In the first graph 410, one or more non-outlier can move (due to perturbation) by a distance that places at least some of non-outliers outside of the original outlier layer. As a result, the outlier threshold after perturbation (illustrated by the dashed circular segment) can become further away from the center than the original outlier layer. At the same time, one or more outliers may move (due to perturbation) by a distance that places at least some of outliers below of the outlier threshold. As such, the non-outlier point(s) which cause this issue can be referred to as "cover points," as they cover the outlier from proper identification. Additionally, the non-outlier may now be in a position where it will be classified as an outlier.

Similarly, graph 420 illustrates that a cover point may move to a location within the outlier layer while an outlier may move closer to the center, such that the outlier is covered by the non-outlier's displacement. Graph 430 illustrates that an outlier can move (due to perturbation) to a location within the core layer, which can result in incorrectly classifying the point as a non-outlier.

Whatever reason for misclassification, the correction server 240, for example, can be configured to discover these issues and/or reclassify the data points. In some implementations, the correction server 240, for example, can determine a distance difference $d_{diff}$ for at least a portion of the perturbed points (e.g., for all possible outliers or for all points in the perturbed data set). The distance difference dm can take the difference of the distance from a center point of a cluster to the perturbed point location and a distance from the center point to the unperturbed location. For a given index i for a point (e.g., a row number where the point S is found), the distance difference can be represented by:

$$d_{diff}(i) = d_c(S'[i]) - d_c(S[i])$$

where S is the data set consisting of points where S[i] is the point at index i, S' is the set of perturbed points, and c is the center point of S (which can be determined by averaging each dimension).

In some aspects, distance between two k-dimensional points c and x can be measured as the Minkowski distance, which can be represented by:

$$d(c,x) = d_c(x) = (\Sigma_{i=0}^{k} x_i - c_i^m)^{1/m}$$

In some aspects, this representation is a generalization of Euclidian distance and/or Manhattan distance by using m=2 or m=1, respectively. However, in some aspects, Minkowski distance can be better suited for a Laplace distribution.

In some implementations, the plurality of sensors 210, for example, can provide the distance difference $d_{diff}$ for all points, or at least all outliers identified/classified by the analyst server 230. In some implementations, the correction server 240 or the analyst server 230 can provide the indices of the outliers to at least a portion of the plurality of sensors 210, which can, in turn, calculate and/or return the distance differences $d_{diff}$ for the outliers. The distance differences $d_{diff}$ for non-outliers can be determined in a similar manner. In some implementations, at least a portion of the plurality of sensors 210 can provide distance differences $d_{diff}$ without receiving a set of indices.

These distance differences $d_{diff}$ can be sorted in order of highest to lowest (or vice versa), and/or the largest jump between consecutive distance difference $d_{diff}$ values can be identified. The lower value, from the two distance difference $d_{diff}$ values that have the largest jump between them (or the higher value), can be set as a threshold value for "true positives" (Tp). For example, the distance difference for point t can be identified by the following formula $$\arg \max_{j \in J} d_{diff}[j+1] - d_{diff}[j]$$

where J is the list of indices sorted in ascending $d_{diff}$ values.

True positives can refer to perturbed data points identified as outliers by the analyst server 230 which are confirmed by the correction server to be outliers. Specifically, an outlier can be identified as a true positive if its distance difference $d_{diff}$ is less than or equal to the threshold. These true positives can be included in the data subset 250. False positives (Fp)

can be similarly identified by determining whether the corresponding distance difference $d_{\textit{diff}}$ for the point is greater than the threshold. The threshold can be similar to the outlier threshold after perturbation illustrated in FIG. 4. As the determinations of whether each outlier qualifies as a true positive (or a false positive) are performed on an individual basis, the identification of outliers on an individual basis can be provided. In some implementations with smaller separations between outliers and non-outliers, the separation of false positives and true positives can be enhanced by secure computation.

Figure 5C:
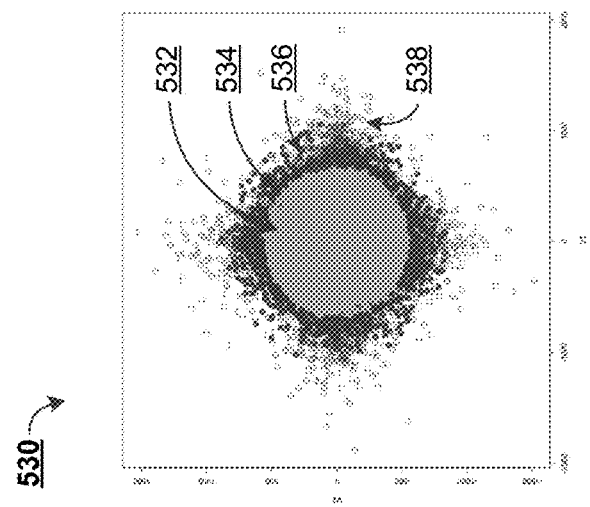
FIG. 5C depicts a graph of perturbed data points within a second distance change range in a coordinate space, in accordance with some example implementations.

After true positives and false positives for outliers are identified, analysis of the non-outliers identified by the analyst server 230 can be conducted to identify true negatives and/or false negatives. The analysis can include multiple layers of evaluations of points in a coordinate space. For example, a first layer can include determining all points which have a negative distance difference $d_{\textit{diff}}$ (e.g., points which moved closer to the center due to perturbation). These points can be added to a list and/or the points in the list can be identified as false negatives (e.g., outliers). FIG. 5A depicts a graph of perturbed data points with a negative distance change in a coordinate space, in accordance with some example implementations. As illustrated, the inner-portion 512 (darker) can include the false negatives which are correctly detected as part of the first layer, the next portion 514 (lighter) can include remaining false negatives not detected as part of the first layer, and/or the outer-portion 516 can include points identified as non-outliers (e.g., true negatives). The result of the first layer can be expressed as:

$$FN_1 = \{i \in I | d_{\textit{diff}}[i] \leq 0\}$$

where I is the set of all point indices.

A second layer of analysis can include identifying all non-outliers which have a distance difference $d_{\textit{diff}}$ that is between zero and a minimum distance difference $d_{\textit{diff}}$ for the true positives ($\min_{Tp}$). In some implementations, only the non-outliers which have a distance from the center point c that is the same or greater than the smallest distance difference dm from among the detected true positive. For example, only non-outliers which are $$d_c(S'[i]) \geq \min_{Tp}$$

where $\min_{Tp} = \min(d_{\textit{diff}}(t))$ and t is an index of a point in the true positives TP.

Figure 5B:
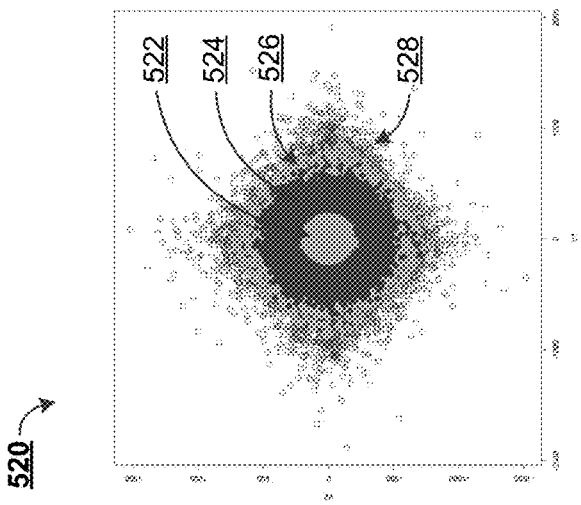
FIG. 5B depicts a graph of perturbed data points within a first distance change range in a coordinate space, in accordance with some example implementations.
Figure 5A:
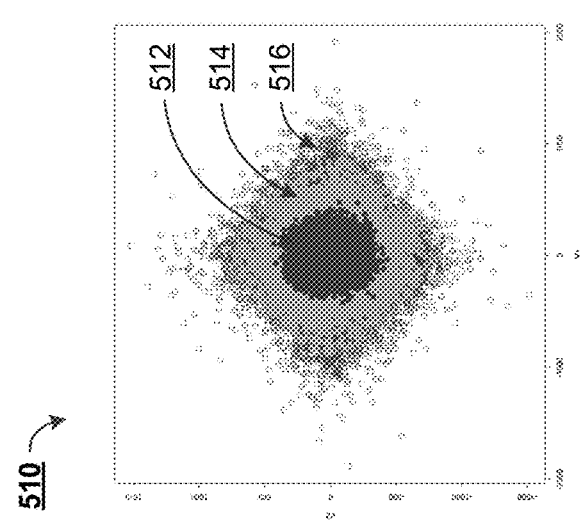
FIG. 5A depicts a graph of perturbed data points with a negative distance change in a coordinate space, in accordance with some example implementations.

FIG. 5B depicts a graph of perturbed data points within a first distance change range in a coordinate space, in accordance with some example implementations. As illustrated, the inner-portion 522 (lighter) can include points identified as non-outliers that are not part of the second layer of analysis (e.g., points where $d_c(S'[i]) \geq \min_{Tp}$), the next portion 524 (darker) can include the false negatives which are properly identified as part of the second layer, the next portion 526 (lighter) can include false negatives that are not identified as part of the second layer of analysis, and/or the outer-portion 528 can include points true negatives. In some implementations, the points located within the inner-portion 522 might not be considered as part of the second layer of analysis, based upon their position and/or due to the fact that the false negatives which fell within this range were removed in the first layer of analysis. In order to exclude these points from analysis, they can be added to or removed from a list after the first layer of analysis. The result of the second layer can be expressed as:

$$FN_2 = \{i \in I_2 | 0 < d_{\textit{diff}}[i] \leq \min_{Tp}\}$$

where $I_2 = \{i | d(c, S'[i]) \geq \min_{Tp}\}$

A third layer of analysis can include identifying all non-outliers which have a distance difference $d_{\textit{diff}}$ that is between the minimum distance difference $d_{\textit{diff}}$ for the true positives ($\min_{Tp}$) and the sum of $\min_{Tp}$ and a width of the outlier layer ($w_O$). For example, points may be considered if they are within the range $$\min_{Tp} > d_c(S'[i]) \geq \min_{Tp} + w_O$$

In some implementations, $w_O$ can be based upon historical data and/or set to a specified value. The width of the outlier layer ($w_O$) can be defined as the distance from the center to the outlier furthest away from the center, minus the distance from the center to the outlier nearest to the center in the unperturbed data set. In some aspects, the value of $w_O$ can be calculated by at least a portion of the sensors 210 (e.g., by ordering a list of outliers based on their distance from a center point) and/or provided to the correction server 240. In some embodiments, an upper bound for $\min_{Tp} + w_O$ can be approximated by the minimum distance change for all detected false positives Fp. FIG. 5C depicts a graph of perturbed data points within a second distance change range in a coordinate space, in accordance with some example implementations. As illustrated, the inner-portion 532 (lighter) can include points identified as non-outliers that are not part of the third layer of analysis (e.g., points where $\min_{Tp} > d_c(S'[i]) \geq \min_{Tp} + w_O$), the next portion 534 (darker) can include the false negatives which are properly identified as part of the third layer, the next portion 536 (slightly lighter) can include false negatives that are not identified as part of the third layer of analysis, and/or the outer-portion 538 can include true negatives. In some implementations, the points located within the inner-portion 532 might not be considered as part of the third layer of analysis, based upon their position and/or due to the fact that the false negatives which fell within this range were removed (e.g., identified as outliers) in the second layer of analysis. In order to exclude these points from analysis, they can be added to or removed from a list after the second layer of analysis. The result of the third layer can be expressed as:

$$FN_3 = \{i \in I_3 | \min_{TP} < d_{\textit{diff}}[i] \leq \min_{Tp} + w_O\}$$

where $I_3 = \{i | d(c, S'[i]) \geq \min_{Tp} + w_O\}$

Once all false negatives are identified, the indices of true positives Tp and false negatives can be released (e.g., as the data subset 250). In some implementations, the three-layered detection of false-negatives can be performed upon all indices from the original data set (unperturbed), or some portion thereof. For example, points identified as false positives Fp may still be processed by the three-layered detection procedures. However, the true positives and/or false positives might be removed from consideration. Additionally or alternatively, the list of indices analyzed can be filtered as each layer in the analysis is performed. Thus, in some implementations, the resulting list can include at least a portion of the detected non-outliers.

In some implementations, if the underlying data set contains more than one cluster of data, then it may be split it into sets with only one cluster each. In some aspects, the split can be performed by the data owner or a third party.

Figure 6:
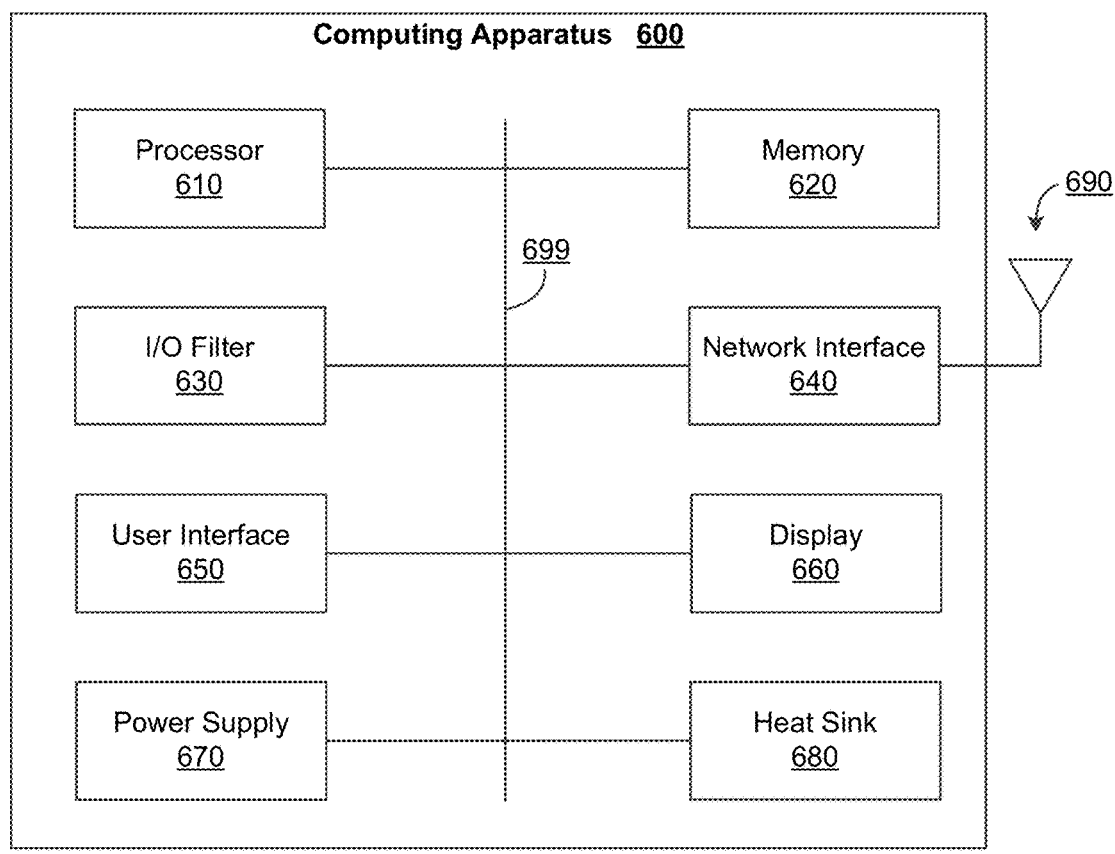
FIG. 6 depicts a block diagram of an example computing apparatus, in accordance with some example implementations.

FIG. 6 illustrates an example computing apparatus 600 which may be used to implement one or more of the described devices and/or components, in accordance with some example implementations. For example, at least a portion of the computing apparatus 600 may be used to implement at least a portion of the computing device 110, an apparatus providing the database 120, an apparatus providing the external software 130, the user access device 140, one or more of the IoT devices 150, and/or the access device 165. Computing apparatus 600 may perform one or more of the processes described herein.

As illustrated, computing apparatus 600 may include one or more processors such as processor 610 to execute instructions that may implement operations consistent with those described herein. Apparatus 600 may include memory 620 to store executable instructions and/or information. Memory 620 may include solid-state memory, solid-state disk drives, magnetic disk drives, or any other information storage device. In some aspects, the memory 620 may provide storage for at least a portion of a database (e.g., the database 120 or some other organization of data). Apparatus 600 may include a network interface 640 to a wired network or a wireless network, such as the network 160 of FIG. 1. Wireless networks may include WiFi, WiMax, and cellular networks (2G/3G/4G/5G), and/or any other wireless network. In order to effectuate wireless communications, the network interface 640, for example, may utilize one or more antennas, such as antenna 680.

Apparatus 600 may include one or more user interface, such as user interface 650. The user interface 650 can include hardware or software interfaces, such as a keyboard, mouse, or other interface, some of which may include a touchscreen integrated with a display 630. The display 630 may be used to display information such as promotional offers or current inventory, provide prompts to a user, receive user input, and/or the like. In various implementations, the user interface 650 can include one or more peripheral devices and/or the user interface 650 may be configured to communicate with these peripheral devices.

In some aspects, the user interface 650 may include one or more of the sensors described herein and/or may include an interface to one or more of the sensors described herein. The operation of these sensors may be controlled at least in part by a sensor module 660. The apparatus 500 may also comprise and input and output filter 670, which can filter information received from the sensors or other user interfaces, received and/or transmitted by the network interface, and/or the like. For example, signals detected through the sensors can be passed through the filter 670 for proper signal conditioning, and the filtered data may then be passed to the microcontroller sensor module 660 and/or processor 610 for validation and processing (e.g., before transmitting results or an indication via the network interface 640). The apparatus 600 may be powered through the use of one or more power sources, such as power source 690. As illustrated, one or more of the components of the apparatus 600 may communicate and/or receive power through a system bus 699.

FIG. 7 illustrates a flowchart of a method for differential privacy and/or outlier detection within a non-interactive model, in accordance with some example implementations. In various implementations, the method 700 (or at least a portion thereof) may be performed by one or more of the computing system 110, an apparatus providing the database 120, an apparatus providing the external software 130, a user access device 140, one or more of the IoT devices 150, the access device 165, the apparatus 600, other related apparatuses, and/or some portion thereof. In some aspects, the apparatus 600 may be regarded as a server.

Method 700 can start at operational block 710 where one or more sensors, for example, can generate a perturbed data set by anonymizing an unperturbed data set based on a noise function. In some aspects, the noise function can include a perturbation function and/or a plurality of perturbed data points can be generated to represent perturbed points corresponding to each of a plurality of unperturbed data points. The unperturbed data points (e.g., the original data points) can be classified based upon characteristics of corresponding (e.g., the same index) perturbed data points (e.g., anonymized data points).

Method 700 can proceed to operational block 720 where a first server, for example, can receive the perturbed data set comprising a plurality of perturbed data points containing anonymized versions of a plurality of unperturbed data points from the unperturbed data set. The perturbed data set may be received from at least a portion of the plurality of sensor devices or an intermediary device. In some aspects, the anonymization can be performed by a separate apparatus (e.g., one or more of the plurality of sensor devices) from the entity that receives the data (e.g., a server or a cloud computing device). In some aspects, the plurality of perturbed data points can lie around a first center point and/or the plurality of unperturbed data points can lie around a second center point. The first center point can be calculated based upon calculating an average location of at least a portion of the plurality of perturbed data points. Similarly, the second center point can be calculated based upon calculating an average location of at least a portion (e.g., an identified cluster) of the plurality of unperturbed data points. In some implementations, only the second center point is calculated and/or the first data point is set to equal the second center point.

Method 700 can proceed to operational block 730 where the first server, for example, can a portion of the plurality of unperturbed data points as presumed outliers based upon locations of the perturbed data points. In some aspects, each of the plurality of unperturbed data points can additionally or alternatively be classified as presumed outliers (or non-outliers) based upon density of surrounding points, depth of the point, neighborhood to which the point belongs, and/or the like.

Method 700 can proceed to operational block 740 where the first server, for example, can classify a portion of the plurality of unperturbed data points as presumed non-outliers based upon locations of the perturbed data points. In some implementations, classifying the portion of the plurality of unperturbed data points as the presumed outliers and/or the portion of the plurality of unperturbed data points as the presumed non-outliers can be based upon a clustering algorithm (e.g., a DBSCAN operation or the like).

Method 700 can proceed to operational block 750 where a second server, for example, can (re)classify the presumed outliers as true positives and false positives based upon distance differences. In some implementations, classifying the presumed outliers as true positives and/or false positives can include determining a threshold distance from the first center point, classifying each presumed outlier as a false positive when a corresponding distance difference for the presumed outlier is less than (or equal to) the threshold distance away from the first center point, and/or classifying each presumed outlier as a true positive when a corresponding distance difference for the presumed outlier is greater than the threshold distance away from the first center point. Determining the threshold difference can include ordering a plurality of distance differences in an ordered list, identifying a largest change between two consecutive differences in the ordered list, and/or and setting the threshold distance as the largest change.

Method 700 can proceed to operational block 760 where the second server, for example, can (re)classify a portion of the presumed non-outliers as false negatives based upon distance differences. In some implementations, a distance difference can include a difference between a distance of a perturbed data point (e.g., of the plurality of perturbed data points) from the first center point and a distance of a corresponding (e.g., same index) unperturbed data point (e.g., of the plurality of unperturbed data points) from the second center point. A distance difference can be calculated for each point, or some portion thereof (e.g., for the outliers).

Method 700 can proceed to operational block 770 where the second server, for example, can provide a list of confirmed outliers. In some implementations, providing the list of confirmed outliers can include providing correctly identified outliers (e.g., true positives) and/or the false negatives. In some implementations, classifying the portion of the plurality of presumed non-outliers as confirmed outliers can include storing/providing each of the perturbed data points (or just the presumed non-outliers) within a list (e.g., I, which can be generated by the first server and/or provided to the second server), and/or reclassifying each unperturbed data point/presumed non-outlier in the list with a distance difference that is negative as false negatives (e.g., classifying the points as outliers). In some implementations, classifying the portion of the presumed non-outliers as false negatives can include identifying a minimum distance difference from among the true positives (e.g., $\min_{T_p}$), storing/providing each of the presumed non-outliers within a list (e.g., $I_2$, which can be generated by the first server and/or provided to the second server) that are at a distance from the first center point that is greater or equal to the minimum distance, and/or reclassifying each presumed non-outlier in the list with a distance difference between zero and the minimum distance difference as false negatives (e.g., classifying the points as outliers). Similarly, classifying the portion of the non-outliers as false negatives can include setting an outer boundary value to equal a sum of the minimum distance difference and a width of an outlier layer (e.g., $w_O$), storing/providing each of the presumed non-outliers within a list (e.g., $I_3$, which can be generated by the first server and/or provided to the second server) that are at a distance from the first center point that is greater or equal to the outer boundary value, and/or reclassifying each presumed non-outlier in the list with a distance difference between the threshold distance and the outer boundary (e.g., classifying the points as outliers). In some aspects, the width of the outlier layer can be calculated to equal a difference between an end and a beginning of an area in a coordinate space that includes the outliers (e.g., based upon differences in diameter, radius, and/or the like). In some aspects, the list of outliers can include some non-outliers, depending upon the accuracy of the calculations performed.

In some implementations, operational block 710 can be executed via one or more sensor devices (e.g., the sensors 210 of FIG. 2), at least a portion of operational blocks 720-740 can be executed via a first server (e.g., the analyst server 230 of FIG. 2), and/or at least a portion of operational blocks 750-770 can be executed via a second server (e.g., the correction server 240 of FIG. 2). Performance of the method 700 and/or a portion thereof can allow for protection of data at a data source, and/or allow IoT devices 150 to release anonymized data to the cloud without having to continue storing the data at the IoT device. This can be beneficial for IoT devices 150 (or just about any device), where storage space can be limited. Protection of data at the source can also be beneficial for scalability and/or to protect against any number of unknown intermediaries between a data source and a storage destination. In some aspects, the outlier-detection procedures described herein can have an average runtime of approximately forty milliseconds or less when run on one-hundred thousand two-dimensional points.

Although several aspects are described herein with respect to IoT devices 150, other implementations are possible. For example, the data maintained by a cloud service provide can potentially be used as training data for machine learning. In some aspects, sensors owned/operated by public utilities companies, such as water distribution companies, can be employed to measure consumption of utilities. Through the use of differential privacy described herein, faulty pipes and/or outlets can be detected. For example, outlier detection can be based upon consumption patterns. Differential privacy and/or outlier detection described herein can be used to protect/anonymize just about any type of data.

FIG. 8 depicts an example of a procedure 800 for outlier detection and/or correction, in accordance with some example implementations. In some implementations, the procedure 800, or some portion thereof, can be implemented/executed to provide for outlier detection within a non-interactive model.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. Similarly, although specific entities are described as implementing specific operations, more or less entities can perform at least a portion of the operations. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one processor; and
   at least one memory storing instructions which, when executed by the at least one processor, cause operations comprising:
   receiving a plurality of indices for a plurality of perturbed data points from an perturbed data set generated by one or more sensors, wherein the plurality of perturbed data points are anonymized versions of a plurality of unperturbed data points with the same plurality of indices, wherein receiving the plurality of indices indicates that the plurality of unperturbed data points are identified as presumed outliers, wherein the plurality of perturbed data points lie around a first center point, and wherein the plurality of unperturbed data points lie around a second center point;
   classifying, based upon distance differences, a first portion of the presumed outliers as true positives, wherein the distance differences include, for each of the plurality of perturbed data points, a difference between a distance of the perturbed data point from the first center point and a distance of a corresponding unperturbed data point from the second center point;
   classifying, based upon the distance differences, a second portion of the presumed outliers as false positives, wherein each presumed outlier is classified as a false positive when a corresponding distance difference for the presumed outlier is less than a threshold distance away from the first center point, and wherein each presumed outlier is classified as a true positive when a corresponding distance difference for the presumed outlier is greater than the threshold distance away from the first center point; and
   providing, based on the classifying, a list of confirmed outliers.

2. The system of claim 1, wherein the operations further comprise:
   determining the threshold distance from the first center point, and wherein the one or more sensors comprise at least one Internet of Things sensor.

3. The system of claim 2, wherein the operations further comprise:
   ordering each of the distance differences in an ordered list;
   identifying a largest change between two consecutive differences in the ordered list; and
   setting the threshold distance as the largest change.

4. The system of claim 1, wherein the plurality of unperturbed data points are held among a plurality of sensor devices.

5. The system of claim 1, wherein the operations further comprise:
   determining whether any of the distance differences are negative; and
   classifying each of the plurality of unperturbed data points with a negative distance difference as a false negative.

6. The system of claim 1, wherein the operations further comprise:
   identifying a minimum distance difference from among the true positives;
   receiving indices for a plurality of non-outliers with a distance from the first center point that is greater or equal to the minimum distance; and
   reclassifying, as false negatives, each of the plurality of non-outliers with a distance difference between zero and the minimum distance difference.

7. The system of claim 1, wherein the operations further comprise:
   identifying a minimum distance difference from among the true positives;
   setting an outer boundary value to equal a sum of the minimum distance difference and a width of an outlier layer, wherein the width of the outlier layer is a difference between an end and a beginning of an area in a coordinate space that includes the outliers;
   receiving indices for a plurality of non-outliers with a distance from the first center point that is greater or equal to the outer boundary value; and
   reclassifying, as false negatives, each of the plurality of non-outliers with a distance difference between the threshold distance and the outer boundary.

8. The system of claim 1, wherein the plurality of perturbed data points are anonymized based upon a noise function, and wherein the noise function comprises a perturbation function.

9. A method for protecting data associated with one or more sensors, the method comprising:

receiving, at a processor, a plurality of indices for a plurality of perturbed data points from an perturbed data set generated by one or more sensors, wherein the plurality of perturbed data points are anonymized versions of a plurality of unperturbed data points with the same plurality of indices, wherein receiving the plurality of indices indicates that the plurality of unperturbed data points are identified as presumed outliers, wherein the plurality of perturbed data points lie around a first center point, and wherein the plurality of unperturbed data points lie around a second center point;

classifying, by the processor and based upon distance differences, a first portion of the presumed outliers as true positives, wherein the distance differences include, for each of the plurality of perturbed data points, a difference between a distance of the perturbed data point from the first center point and a distance of a corresponding unperturbed data point from the second center point;

classifying, by the processor and based upon the distance differences, a second portion of the presumed outliers as false positives, wherein each presumed outlier is classified as a false positive when a corresponding distance difference for the presumed outlier is less than a threshold distance away from the first center point, and wherein each presumed outlier is classified as a true positive when a corresponding distance difference for the presumed outlier is greater than the threshold distance away from the first center point; and providing, by the processor and based on the classifying, a list of confirmed outliers.

10. The method of claim 9, further comprising:
ordering each of the distance differences in an ordered list;
identifying a largest change between two consecutive differences in the ordered list; and
setting the threshold distance as the largest change, and wherein the one or more sensors comprise at least one Internet of Things sensor.

11. The method of claim 9, further comprising:
determining whether any of the distance differences are negative; and
classifying each of the plurality of unperturbed data points with a negative distance difference as a false negative.

12. The method of claim 9, further comprising:
identifying a minimum distance difference from among the true positives;
receiving indices for a plurality of non-outliers with a distance from the first center point that is greater or equal to the minimum distance; and
reclassifying, as false negatives, each of the plurality of non-outliers with a distance difference between zero and the minimum distance difference.

13. The method of claim 9, further comprising:
identifying a minimum distance difference from among the true positives;
setting an outer boundary value to equal a sum of the minimum distance difference and a width of an outlier layer, wherein the width of the outlier layer is a difference between an end and a beginning of an area in a coordinate space that includes the outliers;
receiving indices for a plurality of non-outliers with a distance from the first center point that is greater or equal to the outer boundary value; and
reclassifying, as false negatives, each of the plurality of non-outliers with a distance difference between the threshold distance and the outer boundary.

14. A non-transitory computer program product storing instructions which, when executed by at least one data processor, causes operations comprising:

receiving a plurality of indices for a plurality of perturbed data points from an perturbed data set generated by one or more sensors, wherein the plurality of perturbed data points are anonymized versions of a plurality of unperturbed data points with the same plurality of indices, wherein receiving the plurality of indices indicates that the plurality of unperturbed data points are identified as presumed outliers, wherein the plurality of perturbed data points lie around a first center point, and wherein the plurality of unperturbed data points lie around a second center point; and classifying, based upon distance differences, a first portion of the presumed outliers as true positives, wherein the distance differences include, for each of the plurality of perturbed data points, a difference between a distance of the perturbed data point from the first center point and a distance of a corresponding unperturbed data point from the second center point; and classifying, based upon the distance differences, a second portion of the presumed outliers as false positives, wherein each presumed outlier is classified as a false positive when a corresponding distance difference for the presumed outlier is less than the threshold distance away from the first center point, and wherein each presumed outlier is classified as a true positive when a corresponding distance difference for the presumed outlier is greater than the threshold distance away from the first center point; and providing, based on the classifying, a list of confirmed outliers.

15. The non-transitory computer program product of claim 14, wherein the operations further comprise:
ordering each of the distance differences in an ordered list;
identifying a largest change between two consecutive differences in the ordered list; and
setting the threshold distance as the largest change, and wherein the one or more sensors comprise at least one Internet of Things sensor.

16. The non-transitory computer program product of claim 14, wherein the operations further comprise:
determining whether any of the distance differences are negative; and
classifying each of the plurality of unperturbed data points with a negative distance difference as a false negative.

17. The non-transitory computer program product of claim 14, wherein the operations further comprise:
identifying a minimum distance difference from among the true positives;
receiving indices for a plurality of non-outliers with a distance from the first center point that is greater or equal to the minimum distance; and
reclassifying, as false negatives, each of the plurality of non-outliers with a distance difference between zero and the minimum distance difference.

18. The non-transitory computer program product of claim 14, wherein the operations further comprise:
identifying a minimum distance difference from among the true positives;
setting an outer boundary value to equal a sum of the minimum distance difference and a width of an outlier layer, wherein the width of the outlier layer is a difference between an end and a beginning of an area in a coordinate space that includes the outliers;

receiving indices for a plurality of non-outliers with a distance from the first center point that is greater or equal to the outer boundary value; and reclassifying, as false negatives, each of the plurality of non-outliers with a distance difference between the threshold distance and the outer boundary.

\* \* \* \* \*